United States Patent
Matsumoto

(10) Patent No.: US 11,995,312 B2
(45) Date of Patent: May 28, 2024

(54) ELECTRONIC DEVICE AND INFORMATION PROCESSING METHOD FOR GENERATING INFORMATION CORRESPONDING TO AN OPERATION IN RESPONSE TO INPUT OF PREDETERMINED TRIGGER OPERATION IN CONJUNCTION WITH THE OPERATION

(71) Applicant: CASIO COMPUTER CO., LTD., Tokyo (JP)

(72) Inventor: Yoshihisa Matsumoto, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1081 days.

(21) Appl. No.: 16/816,425

(22) Filed: Mar. 12, 2020

(65) Prior Publication Data

US 2020/0301580 A1  Sep. 24, 2020

(30) Foreign Application Priority Data

Mar. 19, 2019 (JP) ................................ 2019-051201

(51) Int. Cl.
| | | |
|---|---|---|
| H04W 4/14 | (2009.01) | |
| G06F 3/01 | (2006.01) | |
| G06F 3/046 | (2006.01) | |
| G06F 3/04883 | (2022.01) | |
| G06F 3/0489 | (2022.01) | |
| G06F 9/451 | (2018.01) | |

(52) U.S. Cl.
CPC .......... *G06F 3/04897* (2013.01); *G06F 9/453* (2018.02)

(58) Field of Classification Search
CPC ............................ G06F 3/04897; G06F 9/453
See application file for complete search history.

(56) References Cited

U.S. PATENT DOCUMENTS

| | | | |
|---|---|---|---|
| 8,271,906 B1 * | 9/2012 | Fong ........................ | G06F 9/451 345/157 |
| 9,374,693 B1 * | 6/2016 | Olincy .............. | H04M 3/42365 |
| 9,727,348 B2 * | 8/2017 | Chen ........................ | G06F 9/453 |

(Continued)

FOREIGN PATENT DOCUMENTS

| | | | |
|---|---|---|---|
| AU | 2014100188 A4 | * | 4/2014 |
| CN | 108538042 A | * | 9/2018 |

(Continued)

OTHER PUBLICATIONS

Axure, "Tooltips Tutorial", published on Apr. 16, 2016 to https://docs.axure.com/axure-rp/tutorials/tooltips/, retrieved on Mar. 8, 2023. (Year: 2016).*

(Continued)

*Primary Examiner* — Shourjo Dasgupta
(74) *Attorney, Agent, or Firm* — Scully, Scott, Murphy & Presser, P.C.

(57) ABSTRACT

An electronic device includes an input device configured to receive an operation, and a processor which performs a function according to the operation input via the input device. The processor is configured to: in response to an input of a first operation indicative of a function to perform via the input device, perform the function specified based on the first operation; and in response to an input of a predetermined trigger operation via the input device in conjunction with the first operation, generate first information corresponding to the first operation.

16 Claims, 7 Drawing Sheets

(56) References Cited

U.S. PATENT DOCUMENTS

| | | | | |
|---|---|---|---|---|
| 2003/0179178 A1* | 9/2003 | Zargham | G06F 3/0219 | 345/156 |
| 2007/0186192 A1* | 8/2007 | Wigdor | G06F 1/1626 | 715/864 |
| 2008/0126073 A1* | 5/2008 | Longe | G06F 3/018 | 345/184 |
| 2009/0027338 A1* | 1/2009 | Weinberg | G10H 1/0083 | 345/157 |
| 2009/0115644 A1* | 5/2009 | Hsieh | G06F 3/017 | 341/23 |
| 2009/0285392 A1* | 11/2009 | Leitheiser | G06Q 30/02 | 709/227 |
| 2010/0039505 A1* | 2/2010 | Inoue | H04N 1/32117 | 348/333.02 |
| 2010/0138655 A1 | 6/2010 | Matsui et al. | | |
| 2010/0167788 A1* | 7/2010 | Choi | G06F 3/017 | 455/566 |
| 2011/0029869 A1* | 2/2011 | McLennan | G06F 3/0236 | 715/702 |
| 2011/0273379 A1* | 11/2011 | Chen | G06F 3/04883 | 340/384.1 |
| 2014/0057610 A1* | 2/2014 | Olincy | H04W 4/16 | 455/414.1 |
| 2014/0184922 A1* | 7/2014 | Schafer | H04N 21/4532 | 348/734 |
| 2014/0229466 A1 | 8/2014 | Ono et al. | | |
| 2014/0247278 A1* | 9/2014 | Samara | G06T 11/00 | 345/633 |
| 2014/0308930 A1* | 10/2014 | Tran | H04W 4/50 | 455/414.1 |
| 2014/0368601 A1* | 12/2014 | deCharms | H04N 7/148 | 348/14.02 |
| 2015/0041530 A1* | 2/2015 | Burkhart | G06K 7/1404 | 235/494 |
| 2015/0215520 A1* | 7/2015 | Ishihara | G02B 27/28 | 348/349 |
| 2016/0086512 A1* | 3/2016 | Yoshizawa | G06F 15/0225 | 434/201 |
| 2016/0212613 A1* | 7/2016 | Huang | H04W 4/70 | |
| 2016/0249194 A1* | 8/2016 | Miyata | G08B 7/066 | |
| 2017/0010359 A1* | 1/2017 | Jung | G01S 17/08 | |
| 2018/0157813 A1* | 6/2018 | Rodrigs | G06V 40/13 | |
| 2018/0253160 A1* | 9/2018 | Bashford | G06F 3/0346 | |
| 2019/0235916 A1* | 8/2019 | Min | G06F 3/048 | |
| 2019/0311098 A1* | 10/2019 | Baldwin | G06N 3/045 | |
| 2019/0311099 A1* | 10/2019 | Baldwin | G06N 3/047 | |
| 2019/0311260 A1* | 10/2019 | Baldwin | G06N 20/20 | |
| 2019/0311261 A1* | 10/2019 | Baldwin | G06N 3/08 | |

FOREIGN PATENT DOCUMENTS

| | | | |
|---|---|---|---|
| CN | 109885217 A | * | 6/2019 |
| JP | H08-171589 A | | 7/1996 |
| JP | 2000-259280 A | | 9/2000 |
| JP | 2002-123349 A | | 4/2002 |
| JP | 2010-050596 A | | 3/2010 |
| JP | 2010-071918 A | | 4/2010 |
| JP | 2010-124385 A | | 6/2010 |
| JP | 2010-228907 A | | 10/2010 |
| JP | 2014153990 A | | 8/2014 |
| JP | 2016-095832 A | | 5/2016 |
| JP | 2016-099800 A | | 5/2016 |

OTHER PUBLICATIONS

"Nokia 3220 Review: Game of Light", published on Aug. 22, 2004 to https://www.gsmarena.com/nokia_3220-review-12.php, retrieved Aug. 28, 2023. (Year: 2004).*

"Nokia introduces mobile search to its smartphones", published on Aug. 8, 2005 to https://www.globenewswire.com/news-release/2005/08/08/1848110/0/en/Nokia-introduces-mobile-search-to-its-smartphones.html, retrieved Aug. 28, 2023. (Year: 2005).*

Jingtao Wang etc., "Camera phone based motion sensing: interaction techniques, applications and performance study", published via UIST '06: Proceedings of the 19th annual ACM symposium on User Interface software and technology, Oct. 2006, retrieved Jan. 10, 2023. (Year: 2006).*

Notice of Reasons for Refusal dated Dec. 14, 2021 received in Japanese Patent Application No. JP 2019-051201 together with an English language translation.

Notice of Reasons for Refusal dated Aug. 10, 2021 received in Japanese Patent Application No. JP 2019-051201 together with an English language translation.

* cited by examiner

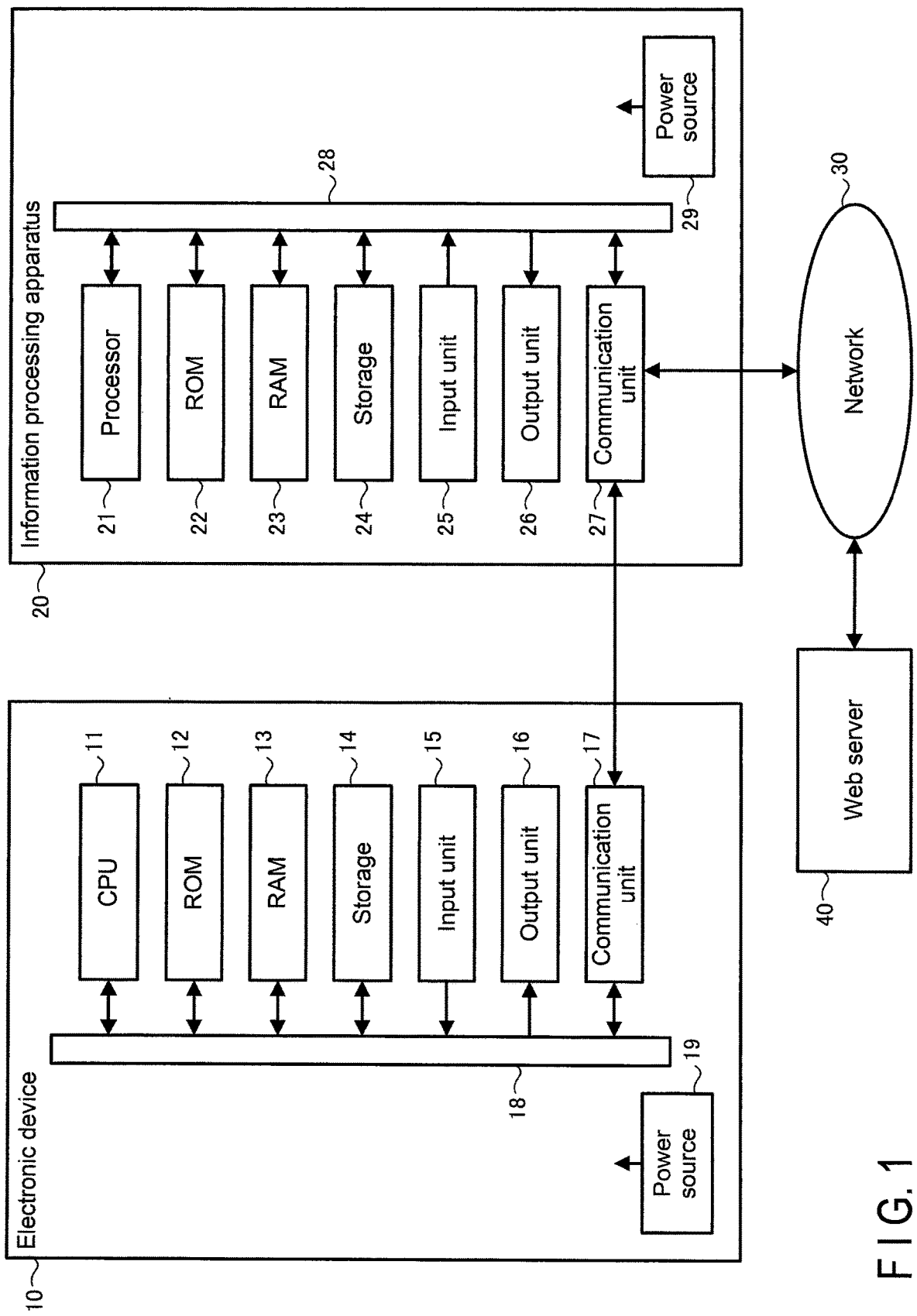
F I G. 1

| | Operation Contents | | Functions | Display Contents | Trigger Actions (First, Second) | | Search Key (Text) Information |
|---|---|---|---|---|---|---|---|
| | | | | | First Action | Second Action | |
| Hard Keys | log | | Display given character string on screen (input area) | log[ ] | Hold down log | Tilt electronic device (calculator) forward with log pressed down | log |
| | SHIFT | log | | 10^[ ] | | | 10^x |
| | ALPHA | log | | B | | | B |
| Soft Keys | log | | | log[ ] | Flick down log | Tilt electronic device (calculator) forward with log pressed down (with flick) | log |
| | SHIFT | log | | 10^[ ] | | | 10^x |
| | ALPHA | log | | B | | | B |
| Mic | log (utterance) | | | log[ ] | Say 'log' in high tone | Tilt electronic device (calculator) forward with 'log' utterance | log |
| | shift (utterance) | log (utterance) | | 10^[ ] | | | 10^x |
| | alpha (utterance) | log (utterance) | | B | | | B |

F I G. 3

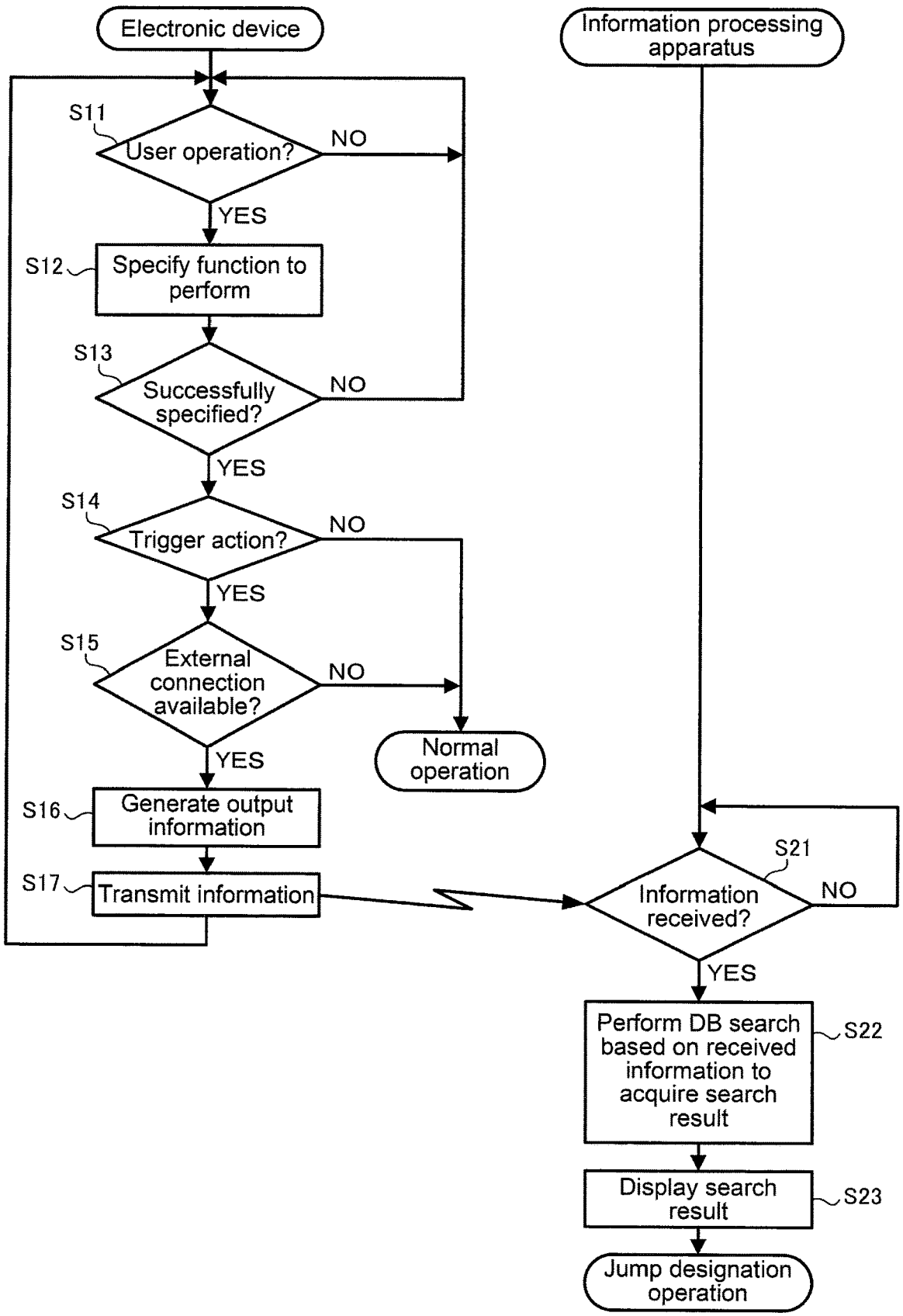
F I G. 4

| Operation Contents | | Functions | Display Contents | Trigger Actions (First, Second) | | Specifying Information |
|---|---|---|---|---|---|---|
| Hard Keys | | | | First Action | Second Action | |
| | log | Display given character string on screen (input area) | log[] | Hold down log | Tilt electronic device (calculator) forward with log pressed down | P7L4C6-8, P15L21C2-4, P15I2, P36L3C4-6, P48L11C2-4, P109L16C7-9, P207I1, P207I3, ... |
| | ... | | ... | | ... | ... |
| ... | | | ... | | ... | ... |

FIG. 7

ELECTRONIC DEVICE AND INFORMATION PROCESSING METHOD FOR GENERATING INFORMATION CORRESPONDING TO AN OPERATION IN RESPONSE TO INPUT OF PREDETERMINED TRIGGER OPERATION IN CONJUNCTION WITH THE OPERATION

CROSS-REFERENCE TO RELATED APPLICATIONS

This application is based upon and claims the benefit of priority from prior Japanese Patent Application No. 2019-051201, filed Mar. 19, 2019, the entire contents of which are incorporated herein by reference.

BACKGROUND OF THE INVENTION

1. Field of the Invention

The disclosure herein relates to an electronic device and an information processing method.

2. Description of the Related Art

Jpn. Pat. Appln. KOKAI Publication No. 2002-123349 discloses a system, in which a camera as an electronic device and a personal computer as an information processing apparatus are communicably connected to each other. When the electronic device is set in a help display mode, and then subjected to a key operation, information about the operated key is sent to the information processing apparatus, and the information processing apparatus displays help information for this key on its screen.

SUMMARY

According to an aspect of the disclosure, an electronic device includes an input device configured to receive an operation, and a processor which performs a function according to the operation input via the input device. The processor is configured to: in response to an input of a first operation indicative of a function to perform via the input device, perform the function specified based on the first operation; and in response to an input of a predetermined trigger operation via the input device in conjunction with the first operation, generate first information corresponding to the first operation.

According to another aspect of the disclosure, a method is implemented in an electronic device which includes an input device configured to receive an operation and a processor configured to perform a function according to the operation input via the input device. The method includes: in response to an input of a first operation indicative of a function to perform via the input device, performing, by the processor, the function specified based on the first operation; and in response to an input of a predetermined trigger operation via the input device in conjunction with the first operation, generating, by the processor, first information corresponding to the first operation.

According to yet another aspect of the disclosure, a method is implemented in an information outputting system which includes an electronic device and an information processing apparatus configured to communicate with the electronic device. The electronic device includes an input device configured to receive an operation and a processor configured to perform a function according to the operation input via the input device. The method includes: in response to an input of a first operation indicative of a function to perform via the input device, performing, by the processor of the electronic device, the function specified based on the first operation; in response to an input of a predetermined trigger operation via the input device in conjunction with the first operation, generating and outputting, by the processor of the electronic device, first information corresponding to the first operation so that the first information is received by the information processing apparatus; acquiring, by the information processing apparatus, the first information; extracting, by the information processing apparatus and based on second information corresponding to the first information, an information portion corresponding to the second information from information about the electronic device, stored in a memory of the information processing apparatus or acquired via a network; and outputting, by the information processing apparatus, information indicative of the information portion corresponding to the second information.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram schematically showing exemplary architecture of an information outputting system according to one embodiment of the present disclosure.

FIG. 3 is a diagram schematically showing an exemplary storage configuration of a function/search key DB appearing in FIG. 2.

FIG. 4 is a flowchart schematically showing an exemplary operation of the information outputting system.

FIG. 7 is a diagram schematically showing an exemplary storage configuration of a function/search key DB in an information outputting system according to another embodiment of the present disclosure.

DETAILED DESCRIPTION

Figure 2:
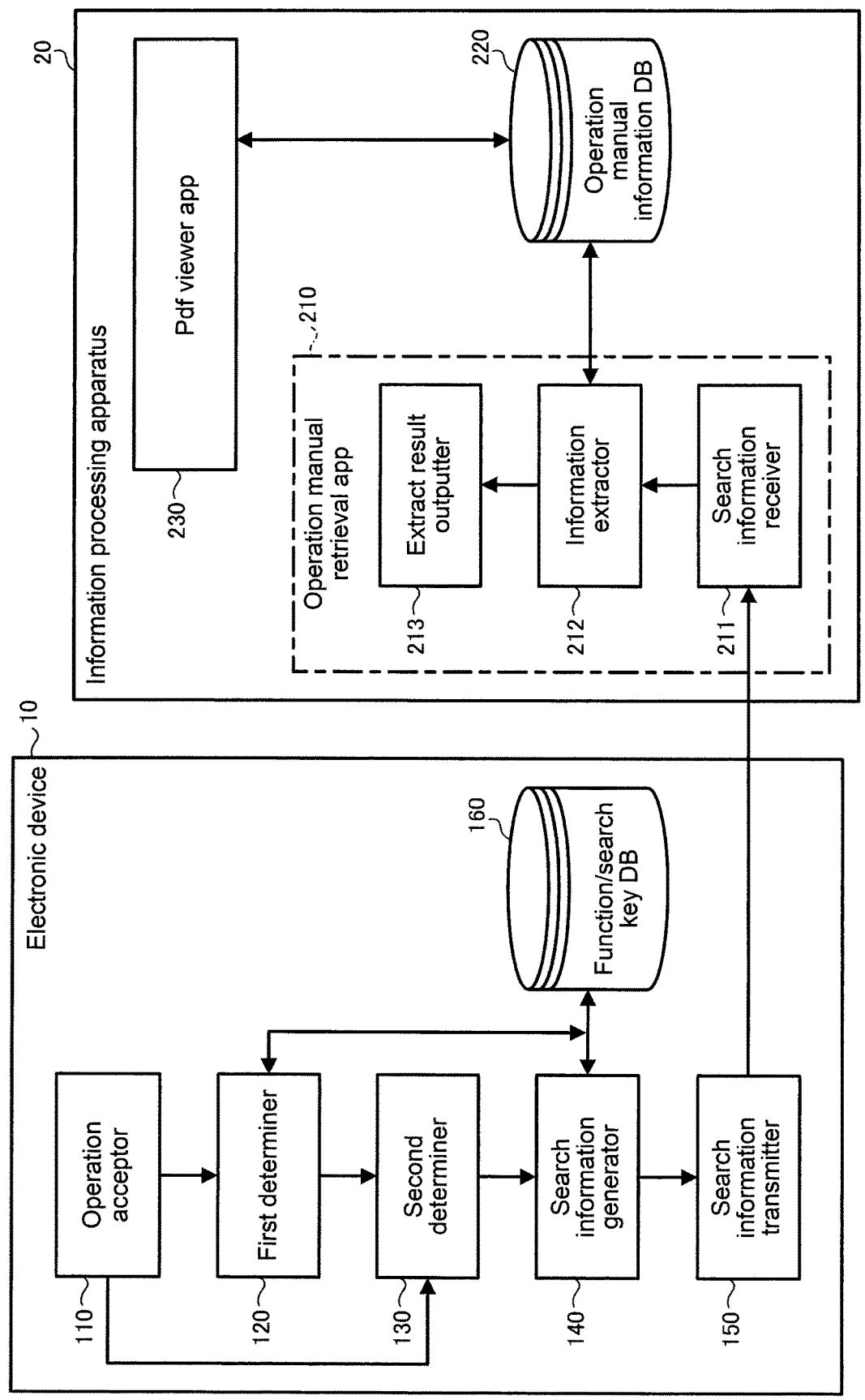
FIG. 2 is a block diagram schematically showing an exemplary functional configuration of the information outputting system.

Certain embodiments of the present disclosure will be described with reference to the drawings.

FIG. 1 is a diagram showing exemplary architecture of an information outputting system according to one embodiment of the present disclosure. The information outputting system includes an electronic device 10 and an information processing apparatus 20. The electronic device 10 and the information processing apparatus 20 are communicably connected to each other by wire or in a wireless manner. The electronic device 10 is a device with multiple keys, and by way of non-limiting example, the embodiment will assume the electronic device 10 to be a scientific electronic calculator. The information processing apparatus 20 may be any apparatus such as, for example, a personal computer (PC), a tablet PC, a smartphone, or an electronic book, as long as it has a function of allowing information viewing. Note that the information processing apparatus 20 is adapted to communicate with a web server 40 via a network 30. The network 30 is, for example, the Internet. The web server 40 offers, for example, a variety of application programs (which may be simply called "app" or "apps") for the information processing apparatus 20 to execute. The web server 40 may be a server run by the manufacturer or the like of the electronic device 10, and provides an electronic manual (operation manual) of the electronic device 10. As such, the information processing apparatus 20 can download the operation manual of the electronic device 10 from the web server 40 via the network 30, and present it for viewing.

The electronic device 10 includes a central processing unit (CPU) 11, a ROM 12, a RAM 13, a storage 14, an input unit 15, an output unit 16, and a communication unit 17. These components are connected to one another via a system bus 18, and each adapted to operate on a supply of power from a power source 19.

The CPU 11 is a processor for controlling the electronic device 10 for various operations. The ROM 12 stores a boot program, etc. The RAM 13 functions as a main storage unit for the CPU 11. The storage 14 stores various programs, parameters, etc., the programs including control programs for use by the CPU 11 and arithmetic programs for conducting various operations. The storage 14 may be a non-volatile memory such as a flash memory. These programs such as control programs, parameters, etc., may instead be stored in the ROM 12 so that the storage 14 is omitted. The CPU 11 controls operations of the electronic device 10 by executing the programs according to input signals from the input unit 15, or receive signals via the communication unit 17.

The input unit 15 may include any given number of hard keys, as well as a touch panel (with soft keys) arranged on a screen of a liquid-crystal display, i.e., the output unit 16. The input unit 15 may also include a voice input part such as a microphone (which may be simply called "mic"), a sensor for detecting the posture of the electronic device 10 such as an acceleration sensor, and so on. With this input unit 15 operated, input signals are provided to the CPU 11 via an input interface (not illustrated) and then the system bus 18.

The output unit 16 includes a liquid-crystal display, a speaker, etc. The output unit 16 may also include a vibrator for generating vibrations. The output unit 16 receives output signals transmitted from the CPU 11 via the system bus 18 and then an output interface (not illustrated).

The communication unit 17 includes, for example, one or more wired or wireless communication interface units to enable transmission and reception of various information sets with external devices including the information processing apparatus 20. The wired interface may adopt, for example, a universal serial bus (USB), etc., and the wireless interface may adopt, for example, a wireless LAN, a low-power wireless data communication standard such as Bluetooth (registered trademark), etc.

The information processing apparatus 20 includes a processor 21, a ROM 22, a RAM 23, a storage 24, an input unit 25, an output unit 26, and a communication unit 27. These components are connected to one another via a system bus 28, and each adapted to operate on a supply of power from a power source 29.

The processor 21 may be an integrated circuit such as a CPU. The ROM 22 stores information used for operations of the processor 21. The RAM 23 functions as a main storage unit for the processor 21. The storage 24 stores control programs, various apps, parameters, etc., for use by the processor 21. These apps may be downloaded to the storage 24 from the web server 40 via the network 30 and the communication unit 27. The processor 21 controls the information processing apparatus 20 to operate according to the programs stored in the storage 24. The processor 21 may be other than a CPU, and the examples of the processor 21 include an application specific integrated circuit (ASIC), a field programmable gate array (FPGA), etc.

The input unit 25 may include a keyboard and a mouse, as well as a touch panel arranged on a screen of a liquid-crystal display, i.e., the output unit 26. The input unit 25 may also include input means for multimedia information, such as a microphone, camera, etc. With the input unit 25 operated, input signals are provided to the processor 21 via an input interface (not illustrated) and then the system bus 28.

The output unit 26 may include an external display device adopting a liquid-crystal display, etc., or a display component of the information processing apparatus 20 which may also adopt a liquid-crystal display, etc. The output unit 26 receives output signals transmitted from the processor 21 via the system bus 28 and then an output interface (not illustrated).

The communication unit 27 includes, for example, one or more wired or wireless communication interface units to enable communication with external devices including the electronic device 10 and communication with external communication networks including the network 30. The wired interface may adopt, for example, a wired LAN, a USB, etc., and the wireless interface may adopt, for example, a wireless LAN, a low-power wireless data communication standard such as Bluetooth (registered trademark), etc.

FIG. 2 is a block diagram schematically showing an exemplary functional configuration of the information outputting system with the above architecture.

The CPU 11 of the electronic device 10 executes the control programs stored in the storage 14 (or the ROM 12) so that it can function as an operation acceptor 110, a first determiner 120, a second determiner 130, a search information generator 140, and a search information transmitter 150.

The operation acceptor 110 accepts user operations via the input unit 25.

The first determiner 120, in response to the operation acceptor 110 having accepted an operation (first operation) from a user, refers to a function/search key database (DB) 160 stored in the storage 14 (or the ROM 12) to specify a function to perform according to the contents of the accepted user operation.

The second determiner 130, in response to the operation acceptor 110 having accepted the first operation from the user, determines whether or not the operation acceptor 110 has also accepted a predetermined trigger action in conjunction with this user operation. If it is determined that the predetermined trigger action has not been accepted, the second determiner 130 passes the information about the function to perform, specified by the first determiner 120, to a corresponding executing part (not illustrated) so that the function will be performed by this part. If, on the other hand, it is determined that the predetermined trigger action has been accepted, the second determiner 130 informs the search information generator 140 of the first operation and the trigger action accepted by the operation acceptor 110.

The search information generator 140, in response to the second determiner 130 having determined that the operation acceptor 110 has accepted the trigger action, refers to the function/search key DB 160 to generate information (first information) corresponding to the user operation accepted by the operation acceptor 110.

The search information transmitter 150 transmits this information generated by the search information generator 140 and corresponding to the user operation, namely, search information, to the information processing apparatus 20 through the communication unit 17.

The function/search key DB 160 stores information about the function referred to by the first determiner 120 and performed by the CPU 11 according to the respective first operation, and the first information referred to by the second determiner 130 and corresponding to the respective first operation. The first information may be any of information specifying the first operation, information specifying a function, or information corresponding to a function.

FIG. 3 is a diagram schematically showing an exemplary storage configuration of the function/search key DB 160. The figure shows, as a typical example, the case with a [[log]] key which is one of many keys constituting the input unit 15. The description will assume instances where the first information is information corresponding to a function, and in particular, the first information is in the form of text data for use as a search key in text searches. Note that use of a double bracket pair ([[ . . . ]]) herein indicates that the term or symbol inserted therein is assigned a single key.

The function/search key DB 160 is adapted to retain records for hard keys, records for soft keys implemented with the liquid-crystal display and the touch panel, and records for microphone-input voices obtained through voice recognition, but it is not a requisite for the function/search key DB 160 to have all of such records. As items in each record, the function/search key DB 160 stores corresponding operation contents, function, display contents, trigger action, and search key (text) information. Each trigger action includes a first action and/or a second action.

The function/search key DB 160 retains the records in association with respective cases. For example, the records for a hard key [[log]] include a record associated with the case of the [[log]] key solely operated, a record associated with the case of the [[log]] key operated in combination with a [[SHIFT]] key (that is, the case where it is operated subsequently to or concurrently with the [[SHIFT]] key), and a record associated with the case of the [[log]] key operated in combination with an [[ALPHA]] key (that is, the case where it is operated subsequently to or concurrently with the [[ALPHA]] key).

For the record associated with the case of the sole [[log]] key operation, the function/search key DB 160 stores "log" as the operation contents, "display given character string on screen (input area)" as the function, "log[ ]" as the display contents, "hold down log" as the first trigger action, "tilt electronic device (calculator) forward with log pressed down" as the second trigger action, and text data "log" as the search key (text) information. For the record associated with the case of the combined [[SHIFT]] key and [[log]] key operation, the function/search key DB 160 stores "SHIFT" and "log" as the operation contents, "display given character string on screen (input area)" as the function, "10^[ ]" as the display contents, "hold down log" as the first trigger action, "tilt electronic device (calculator) forward with log pressed down" as the second trigger action, and text data "10^x" as the search key (text) information. For the record associated with the case of the combined [[ALPHA]] key and [[log]] key operation, the function/search key DB 160 stores "ALPHA" and "log" as the operation contents, "display given character string on screen (input area)" as the function, "B" as the display contents, "hold down log" as the first trigger action, "tilt electronic device (calculator) forward with log pressed down" as the second trigger action, and text data "B" as the search key (text) information. Here, the tilt of the electronic device 10 as the second trigger action can be detected by the acceleration sensor in the input unit 15.

In the function/search key DB 160 of this example, the records for a soft key [[log]] include, similar to the storage configuration for the hard key, a record associated with the case of the [[log]] key solely operated, a record associated with the case of the [[log]] key operated in combination with a [[SHIFT]] key (that is, the case where it is operated subsequently to or concurrently with the [[SHIFT]] key), and a record associated with the case of the [[log]] key operated in combination with an [[ALPHA]] key (that is, the case where it is operated subsequently to or concurrently with the [[ALPHA]] key). Items in each record for the soft key is the same as the respective items for the hard key, except the trigger action. For each record, the function/search key DB 160 stores "flick down log" as the first trigger action, and "tilt electronic device (calculator) forward with log pressed down (with flick)" as the second trigger action.

In the function/search key DB 160, the records for microphone-input voices obtained through voice recognition include a record associated with the case of an utterance "log" solely input, a record associated with the case of the utterance "log" input in combination with an utterance "shift" (that is, the case where the utterance "log" is made subsequently to the utterance "shift"), and a record associated with the case of the utterance "log" input in combination with an utterance "alpha" (that is, the case where the utterance "log" is made subsequently to the utterance "alpha").

For the record associated with the case of the sole "log" utterance input, the function/search key DB 160 stores "log (utterance)" as the operation contents, "display given character string on screen (input area)" as the function, "log[ ]" as the display contents, "say 'log' in high tone" as the first trigger action, "tilt electronic device (calculator) forward with 'log' utterance" as the second trigger action, and text data "log" as the search key (text) information. For the record associated with the case of the combined "shift" utterance and "log" utterance input, the function/search key DB 160 stores "shift (utterance)" and "log (utterance)" as the operation contents, "display given character string on screen (input area)" as the function, "10^[ ]" as the display contents, "say 'log' in high tone" as the first trigger action, "tilt electronic device (calculator) forward with 'log' utterance" as the second trigger action, and text data "10^x" as the search key (text) information. For the record associated with the case of the combined "alpha" utterance and "log" utterance input, the function/search key DB 160 stores "alpha (utterance)" and "log (utterance)" as the operation contents, "display given character string on screen (input area)" as the function, "B" as the display contents, "say 'log' in high tone" as the first trigger action, "tilt electronic device (calculator) forward with 'log' utterance" as the second trigger action, and text data "B" as the search key (text) information.

The processor 21 of the information processing apparatus 20 runs the apps stored in the storage 24 so that it can provide various functions. One of such apps is an operation manual retrieval app 210, and the processor 21, by running this app, can function as a search information receiver 211, an information extractor 212, and an extract result outputter 213. The operation manual retrieval app 210 may be downloaded by the communication unit 27 from the web server 40 via the network 30, and stored in the storage 24.

The search information receiver 211 receives information (first information) corresponding to a user operation, e.g., the search key (text) information, from the electronic device 10 through the communication unit 27.

The information extractor 212 searches an operation manual information DB 220 stored in the storage 24 using, as a search key, information (second information) corresponding to the first information received by the search information receiver 211, and extracts a portion corresponding to the second information from operation manual information contained in the operation manual information DB 220.

Note that the operation manual information DB 220 retains electronic data of the operation manual of the electronic device 10, which may be, for example, a pdf-format electronic manual. Similar to the operation manual retrieval app 210 for example, this operation manual information DB 220 may be downloaded by the communication unit 27 from the web server 40 via the network 30 and stored in the storage 24.

The extract result outputter 213 causes the output unit 26, which may be a liquid-crystal display, to present a display of the portion of the operation manual information that has been extracted by the information extractor 212 and that corresponds to the second information.

The second information corresponding to the first information (information transmitted from the electronic device 10 and corresponding to a user operation) here may be the same as the first information. That is, if the first information is text data (e.g., text "10^x") corresponding to a function as discussed, this first information can be employed as a search key in text searches as it is.

The information processing apparatus 20 may be provided with a pdf viewer app 230 for viewing pdf-format electronic manuals, i.e., electronic data of operation manuals stored in the operation manual information DB 220.

Now, as one example, the description will be given of how the information outputting system with the above configuration operates. FIG. 4 is a flowchart schematically showing an exemplary operation of this information outputting system.

In the electronic device 10, the CPU 11 as the operation acceptor 110 stands by for a user operation (first operation) to be accepted through the hard keys, the soft keys, or the microphone (step S11). In response to the operation acceptor 110 accepting the first operation, the CPU 11 as the first determiner 120 refers to the function/search key DB 160 and specifies the function to perform according to the contents of the accepted user operation (step S12). The CPU 11 as the first determiner 120 determines whether or not the function to perform has been successfully specified (step S13). For example, the function cannot be specified based on the operation of the hard key [[SHIFT]] alone, until a given subsequent operation is done. If it is determined that the function has not been specified, the CPU 11 returns the processing to step S11.

In the event that the operation acceptor 110 accepts an operation of, for example, the hard key [[log]] subsequently to the operation of the hard key [[SHIFT]], the CPU 11 can specify in step S12 that the function to perform is displaying "10^[ ]" on the screen (input area) of the liquid-crystal display as the output unit 16.

If it is determined that the function has been specified, the CPU 11 as the second determiner 130 determines whether or not the operation acceptor 110 has accepted a predetermined trigger action (first action or second action) in conjunction with the user operation (step S14). If it is determined that the predetermined trigger action has not been accepted, the CPU 11 as the second determiner 130 sends the information about the function to perform, specified by the first determiner 120, to a corresponding executing part (not illustrated) so that the function, e.g., displaying "10^[ ]" on the display screen (input area), will be performed by this part.

If, on the other hand, it is determined that the predetermined trigger action, e.g., holding down the [[log]] key, has been accepted, the CPU 11 as the second determiner 130 determines whether or not a connection to the information processing apparatus 20 is established via the communication unit 17 (step S15). If it is determined that the connection to the information processing apparatus 20 is not established, the CPU 11 as the second determiner 130 sends the information about the function to perform, specified by the first determiner 120, to the corresponding executing part (not illustrated) so that the function will be performed by the part.

If it is determined that the connection to the information processing apparatus 20 is established, the CPU 11 as the second determiner 130 informs the search information generator 140 of the first operation and the trigger action accepted by the operation acceptor 110, so that the search information generator 140 is caused to generate output information (step S16). For example, in the event that the hard keys [[SHIFT]] and [[log]] have been operated and further the [[log]] key has been held down, the search information generator 140 acquires text data "10^x" from the function/search key DB 160, and uses this text data as the output information indicative of the information (first information) corresponding to the user operation accepted by the operation acceptor 110.

Then, the CPU 11 as the search information transmitter 150 transmits this output information to the information processing apparatus 20 (step S17), and the CPU 11 returns the processing to step S11.

Meanwhile, in the information processing apparatus 20 where the processor 21 has launched the operation manual retrieval app 210, the processor 21 as the search information receiver 211 stands by for the output information to be received from the electronic device 10 (step S21).

In response to the search information receiver 211 receiving the output information from the electronic device 10, the processor 21 as the information extractor 212 searches the operation manual information DB 220 based on the output information received by the search information receiver 211 to acquire a search result (step S22). For example, if the search information receiver 211 receives text data "10^x", then the pdf-format electronic manual stored in the operation manual information DB 220 is searched for with this text data.

The processor 21 as the extract result outputter 213 causes the liquid-crystal display, i.e., the output unit 26, to display the search result (step S23).

Figure 5A:
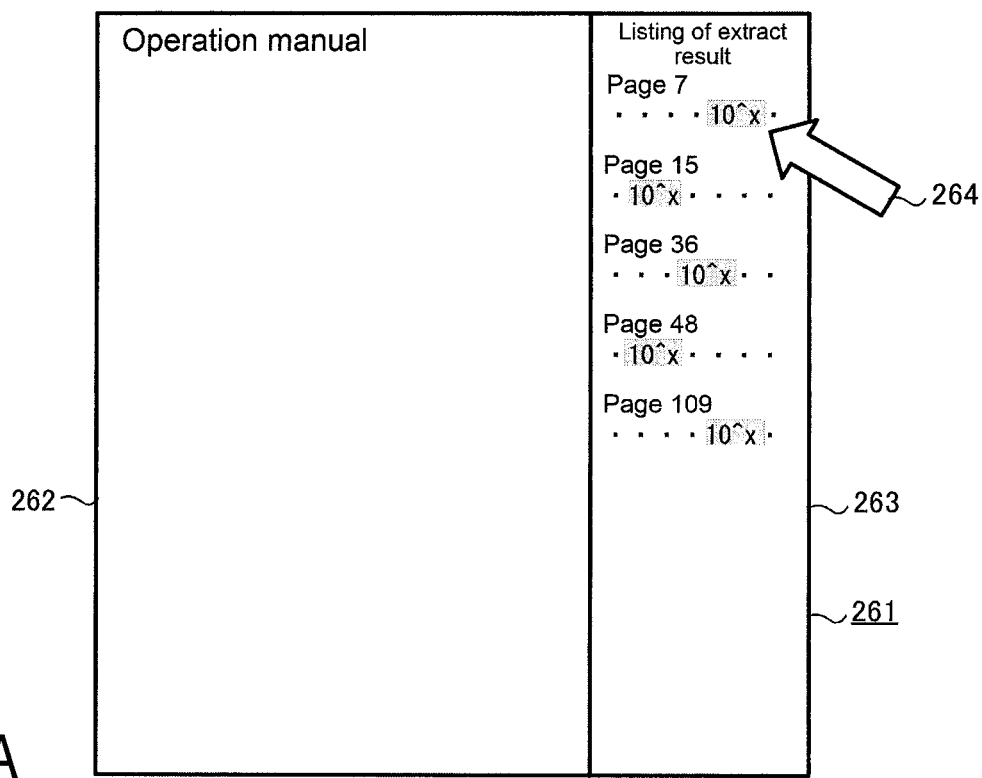
FIG. 5A is a diagram showing an example of an output of a search result.

FIG. 5A is a diagram showing an example of the output of the search result, given by the extract result outputter 213. As shown in this figure, an output screen 261 for the pdf-format electronic manual stored in the operation manual information DB 220 presents the search result through a search result list display area 263 located on the right side of a content display area 262. More specifically, the search result list display area 263 displays, in the form of a list, indications of the pages containing a hit for the text, e.g., "10^x" as the output information from the electronic device 10, together with a part of the respective explanatory sentence that contains the text. Here, the part of the explanatory sentence displayed in the list may distinctly show the hit text portion.

Figure 5B:
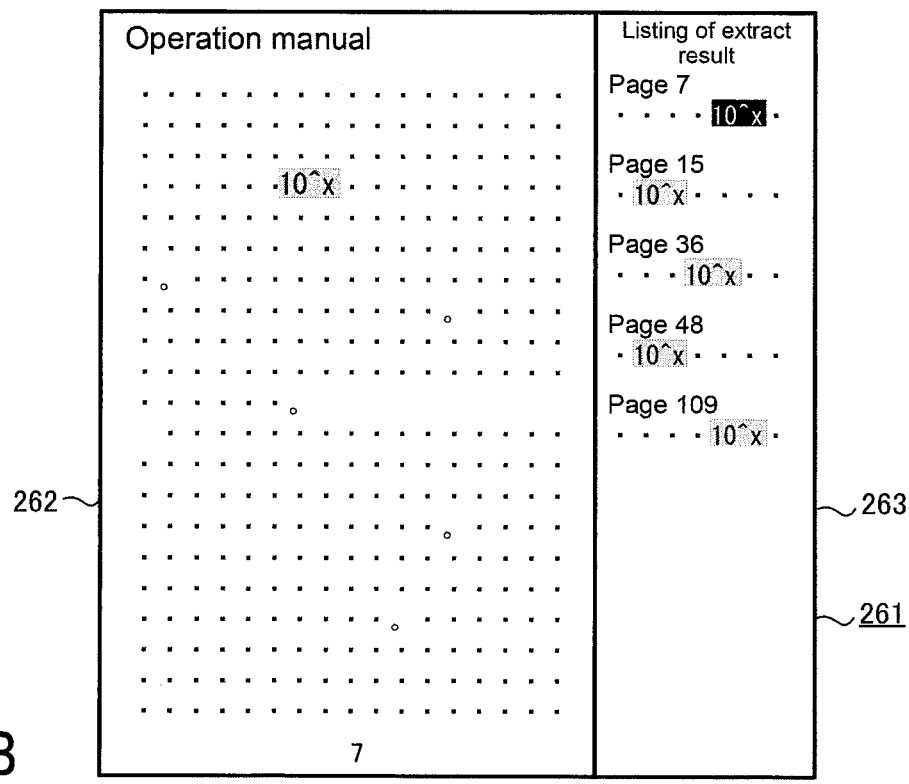
FIG. 5B is a diagram showing an example of an output when a select action is performed on the search result.

After the search result is displayed in the manner as discussed, the processor 21 may transition to an operation for jump designation that uses this output screen 261 for the electronic manual. The jump designation operation may follow the generally employed operations, so its detailed description will be omitted. The jump designation operation here is intended to be, for example, an operation in which a select action is performed on any of the search result displayed in the list as shown in FIG. 5A with an arrow 264, and thereby the corresponding page is displayed on the content display area 262 as shown in FIG. 5B.

As described above, the first information corresponding to the first operation is output from the electronic device 10 to the information processing apparatus 20 in response to the predetermined trigger information input together with the first operation at the electronic device 10. Accordingly, the information processing apparatus 20 can present the information related to the first operation in response to the first information. Consequently, the user is allowed to view the information related to key operations while continuing the normal operations, without the need of mode switching.

For example, in operating an electronic device with many keys such as a scientific electronic calculator, a user needs to refer to the manual until functions of the respective keys are made familiar. The user in this situation could conduct a text search on the pdf-format electronic operation manual downloaded to an information processing apparatus such as a tablet PC, quickly browse the whole of the resultant several to several tens of hits to spot the likely important portions, and read the portions. However, such a measure as conventionally employed requires the electronic device and the information processing apparatus to be both operated, and must proceed with the steps of inputting characters, etc. printed on the keytops and housing of the electronic device to the information processing apparatus for conducting the search; thus, it poses a burden on user operations.

According to the embodiment, with the connection between the electronic device 10 and the information processing apparatus 20 established, a user can readily refer to the applicable portions in the operation manual for the user's ongoing key operation, only by operating the electronic device 10 in a manner that is substantially in line with the normal operations. Only a slight change (e.g., applying a holding down, a tap, etc.) in the operation manner for the input of the trigger information enables switchover between normal operations and displaying the operation manual, and as such, the embodiment can improve usability (ease of making reference to operation manuals) without sacrificing user operability.

The foregoing embodiment has assumed the instances where the first information is information corresponding to a function, for example, text data "10^x" which can be used as a search key in text searches as it is.

Besides such information corresponding to a function, the first information may be the operation contents stored in the function/search key DB 160 as the information specifying the first operation, for example, information indicative of the combination of the [[SHIFT]] key and the [[log]] key. Or, the first information may be the display contents stored in the function/search key DB 160 as the information specifying a function, for example, "10^[ ]". If the first information is the information specifying the first operation or the information specifying a function, the information extractor 212 of the information processing apparatus 20 should convert the first information into the second information for use as a search key for searching the operation manual information DB 220.

Figure 6:
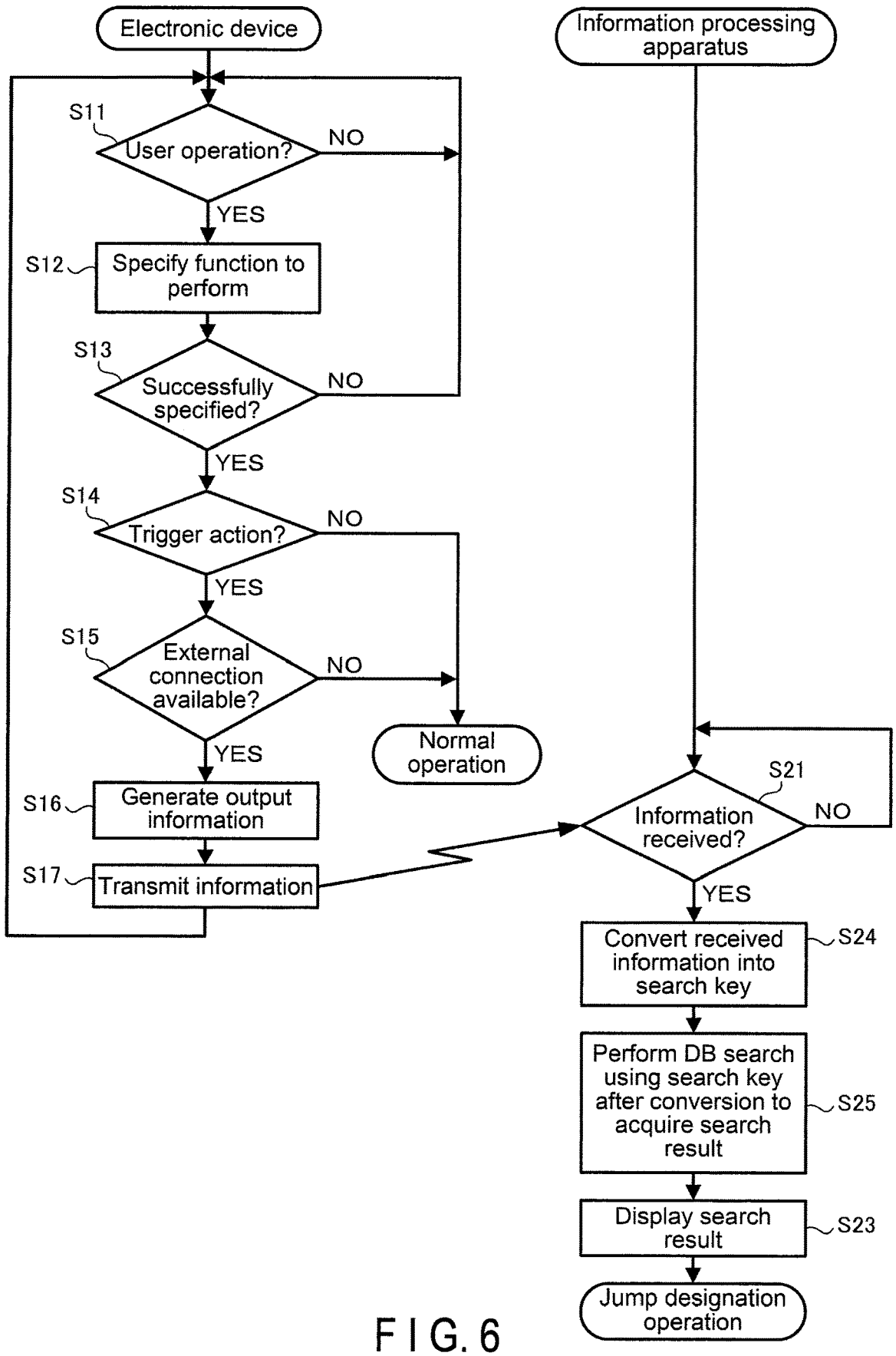
FIG. 6 is a flowchart schematically showing an exemplary operation of an information outputting system according to a modification of one embodiment.

FIG. 6 is a flowchart schematically showing an exemplary operation performed by the information outputting system in such cases. The electronic device 10 operates in the same way as in the foregoing embodiment, but the output information generated by the search information generator 140 in step S16 here is the information specifying the first operation, e.g., information indicative of the combination of the [[SHIFT]] key and the [[log]] key, or the information specifying a function, e.g., "10^[ ]".

Here, the processor 21 that runs the operation manual retrieval app 210 in the information processing apparatus 20 converts the received output information (first information) into the second information, for example, text data "10^x" serving as a search key for searching the operation manual information DB 220 (step S24). In order to enable this conversion, the information processing apparatus 20 may be, for example, provided with a database corresponding to the function/search key DB 160 in the electronic device 10. Similar to the operation manual retrieval app 210 and the operation manual information DB 220 for example, this database may be downloaded by the communication unit 27 from the web server 40 via the network 30 and stored in the storage 24.

The processor 21, using this second information after the conversion as a search key, searches through the pdf-format electronic manual stored in the operation manual information DB 220 to acquire search results (step S25)

As such, the same advantages as in the foregoing embodiment can be realized in also the cases with the first information being the information specifying the first operation or the information specifying a function.

The first information for the foregoing embodiment has been described as the information for allowing the information processing apparatus 20 with the operation manual retrieval app 210 to perform text searches in the operation manual information DB 220, but the first information may be of a different type of information. For example, the first information may be information for specifying locations in the pdf-format electronic operation manual stored in the operation manual information DB 220, where the explanatory information for a corresponding user operation is given.

FIG. 7 is a diagram schematically showing an exemplary storage configuration of a function/search key DB in the information outputting system according to another embodiment of the present disclosure. As shown in this figure, the function/search key DB stores such specifying information in lieu of the search key (text) information as described for the exemplary storage configuration of FIG. 3. The specifying information may contain a page number, a line number, and a character number (e.g., "P7L4C6-8") to directly specify the location in an operation manual. Also, the specifying information may contain a page number and an illustration number (e.g., "P15I2") to specify the location of a figure or an image that cannot be spotted by text searches.

With such specifying information employed as the first information, the information extractor 212 of the information processing apparatus 20 can use the first information as the second information so that a portion corresponding to the second information is extracted from the operation manual information stored in the operation manual information DB 220.

Electronic manuals as the operation manual information stored in the operation manual information DB 220 may be of a file format other than the pdf format. The electronic manuals here may contain tag information, and the first information may be information for specifying the tag information. As a matter of course, pdf-format electronic manuals may also contain such tag information if possible.

As such, the same advantages as in the foregoing embodiment can be realized in also the cases with the first information being the specifying information for specifying locations of the explanatory information for a user operation.

Note that the first information may be encrypted for transmission from the electronic device 10 to the information processing apparatus 20. More specifically, the search information transmitter 150 of the electronic device 10 may have an information encrypting function, and the search information receiver 211 of the information processing apparatus 20 may have an information decrypting function. This configuration enhances the communication security.

Moreover, the first information may be provided from the electronic device 10 to the information processing apparatus 20 through a technique other than the communication technology. For example, the search information transmitter 150 of the electronic device 10 may encode given information to generate a QR-code image and cause the liquid-crystal display as the output unit 16 to display the QR-code image, and the search information receiver 211 of the information processing apparatus 20 may take the QR-code image using the camera as the input unit 25 and decode the QR-code image into the original information. It is also possible to adopt a technique of converting the first information into a sound (e.g., ultrasound) or vibrations (e.g., Morse code utilizing on/off vibrations) by the speaker or the vibrator as the output unit 16 of the electronic device 10, and detecting the sound or the vibrations by the microphone as the input unit 25 of the information processing apparatus 20. In this manner, the first information can be provided from the electronic device 10 to the information processing apparatus 20 through a technique other than the communication technology.

The foregoing embodiment has assumed that the operation manual information DB 220 is stored in the storage 24, but the operation manual information DB 220 may be arranged on the web server 40. In this case, the information extractor 212 of the information processing apparatus 20 may extract a portion corresponding to the second information via the network 30 by the communication unit 27.

According to the present disclosure, the first information is generated by the search information generator 140 and then transmitted to the information processing apparatus 20 by the search information transmitter 150, and the information processing apparatus 20 implements extraction and output of a portion of the operation manual information that corresponds to the second information. The disclosure intends no limitation by this. The electronic device 10 may take over at least part of the functions of the information processing apparatus 20. For example, the processor (CPU 11) of the electronic device 10 may perform the function of the information extractor 212. With such a configuration, the electronic device 10, using the processor (CPU 11), extracts a portion corresponding to the second information (information corresponding to the first information) from the explanatory information about the electronic device 10, stored in the storage 14 of the electronic device 10 or acquired via the network, instead of transmitting the first information to the information processing apparatus 20. The electronic device 10 then transmits the extracted information to the information processing apparatus 20 by the search information transmitter 150. Subsequently, the extracted information is displayed on the output unit 26, such as a liquid-crystal display, in the information processing apparatus 20. Moreover, the electronic device 10 may itself output the explanatory information extracted by the processor (CPU 11) as, for example, a display presented through the liquid-crystal display, etc. of the electronic device 10.

In the present disclosure, the information related to the first operation has been described as, by way of example, explanatory information appearing in an operation manual. However, the information related to the first operation is not limited to such explanatory information in an operation manual, and may be other types of information including, for example, explanatory information about formulas or knowledge associated with a function specified by the first operation.

Furthermore, the present disclosure is not limited to the foregoing embodiments. For practical implementation, various modifications may be adopted without departing from the gist of the disclosure. Also, the embodiments may be discretionarily combined for implementation, and such combinations will produce combined effects. Still more, the foregoing embodiments involve various inventive aspects, and appropriate combinations of the features disclosed herein shall permit various inventions to be derived. For example, one or more of the features discussed for a certain embodiment may be omitted, and provided that such modification can solve the intended problem and bring the intended effects, the modification should be deemed an invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
   an input device configured to receive a key operation as a first operation;
   an acceleration sensor configured to detect a tilt of the electronic device as a predetermined trigger operation; and
   a processor configured to:
   in response to an input of the first operation without input of the predetermined trigger operation, specify a function to perform according to the key operation and perform the function;
   in response to an input of the predetermined trigger operation via the acceleration sensor in conjunction with the first operation, generate first information corresponding to the function, wherein the first information is in the form of text data for use in searches for information regarding the performance of the function; and
   send the first information to an external information processing apparatus to cause the external information processing apparatus to control a display to display the information regarding the performance of the function.

2. The electronic device according to claim 1,
wherein the processor is configured to extract, based on second information corresponding to the first information, the information regarding the performance of the function, stored in a memory of the electronic device or acquired via a network.

3. The electronic device according to claim 2,
wherein the processor is configured to:
determine whether or not the predetermined trigger operation is input via the acceleration sensor in conjunction with the first operation; and
in response to determining that the predetermined trigger operation is input via the acceleration sensor in conjunction with receiving the input of the first operation, generate the first information corresponding to the function.

4. The electronic device according to claim 1,
wherein the text data for use in searches for information regarding the performance of the function specifies one or more locations in a stored file in which the information regarding the performance of the function is given.

5. The electronic device according to claim 1,
wherein the processor is configured to:
determine whether or not the predetermined trigger operation is input via the acceleration sensor in conjunction with the first operation; and
in response to determining that the predetermined trigger operation is input via the acceleration sensor in conjunction with receiving the input of the first operation, generate the first information corresponding to the function.

6. The electronic device according to claim 1, further comprising a communication device configured to output the first information so that the first information is received by the external information processing apparatus that is provided with the information regarding the performance of the function.

7. The electronic device according to claim 1, further comprising a display device configured to display information,
wherein the processor is configured to encode the first information to generate a QR-code image, and cause the display device to display the QR-code image.

8. The electronic device according to claim 1, further comprising a communication device configured to communicate with an external entity,
wherein the processor is configured to encrypt the first information to generate an encrypted first information, and cause the communication device to output the encrypted first information to the external entity.

9. A method implemented in an electronic device, the electronic device comprising an input device configured to receive a key operation as a first operation, an acceleration sensor configured to detect a tilt of the electronic device as a predetermined trigger operation and a processor, the method comprising:
receiving, by the input device, an input of the first operation specifying a function to perform;
in response to the input of the first operation without input of the predetermined trigger operation, specifying the function to perform according to the key operation and performing, by the processor, the function;
inputting, via the acceleration sensor, the predetermined trigger operation in conjunction with the input of the first operation specifying the function;
in response to the inputting of the predetermined trigger operation via the acceleration sensor in conjunction with receiving the input of the first operation, generating, by the processor, first information corresponding to the function, wherein the first information is in the form of text data for use in searches for information regarding the performance of the function; and
sending the first information to an external information processing apparatus to cause the external information processing apparatus to control a display to display the information regarding the performance of the function.

10. The method according to claim 9, further comprising extracting, by the processor and based on second information corresponding to the first information, the information regarding the performance of the function, stored in a memory of the electronic device or acquired via a network.

11. The method according to claim 9,
wherein the text data for use in searches for information regarding the performance of the function specifies one or more locations in a stored file in which the information regarding the performance of the function is given.

12. The method according to claim 9,
wherein the generating the first information comprises:
determining, by the processor, that the predetermined trigger operation is input via the acceleration sensor in conjunction with the first operation; and
in response to determining that the predetermined trigger operation is input via the acceleration sensor in conjunction with receiving the input of the first operation, generating, by the processor, the first information corresponding to the function.

13. A method implemented in an information outputting system, the information outputting system comprising an electronic device and an information processing apparatus configured to communicate with the electronic device, the electronic device comprising an input device configured to receive a key operation as a first operation, an acceleration sensor configured to detect a tilt of the electronic device as a predetermined trigger operation and a processor, the method comprising:
receiving, by the input device, an input of the first operation specifying a function to perform;
in response to the input of the first operation without input of the predetermined trigger operation, specifying the function to perform according to the key operation and performing, by the processor of the electronic device, the function;
inputting, via the acceleration sensor of the electronic device, the predetermined trigger operation in conjunction with the input of the first operation specifying the function;
in response to the inputting of the predetermined trigger operation via the acceleration sensor in conjunction with receiving the input of the first operation, generating and outputting, by the processor of the electronic device, first information corresponding to the function, wherein the first information is in the form of text data for use in searches for information regarding the performance of the function;
acquiring, by the information processing apparatus, the first information;
extracting, by the information processing apparatus and based on second information corresponding to the first information, the information regarding the performance of the function, stored in a memory of the information processing apparatus or acquired via a network; and controlling, by the information processing apparatus, a display to display the information regarding the performance of the function.

14. The method according to claim 13, wherein the extracting the information regarding the performance of the function comprises searching, by the information processing apparatus, for the information regarding the performance of the function with the text data as a key.

15. The method according to claim 13, wherein the text data for use in searches for information regarding the performance of the function specifies one or more locations in a stored file in which the information regarding the performance of the function is given.

16. The method according to claim 13, wherein the generating the first information comprises:
- determining, by the processor of the electronic device, that the predetermined trigger operation is input via the acceleration sensor in conjunction with the first operation; and
- in response to determining that the predetermined trigger operation is input via the acceleration sensor in conjunction with receiving the input of the first operation, generating, by the processor, the first information corresponding to the function.

\* \* \* \* \*